United States Patent
Xu

(10) Patent No.: US 12,093,314 B2
(45) Date of Patent: Sep. 17, 2024

(54) ACCOMPANIMENT CLASSIFICATION METHOD AND APPARATUS

(71) Applicant: Tencent Music Entertainment Technology (Shenzhen) Co., Ltd., Guangdong (CN)

(72) Inventor: Dong Xu, Guangdong (CN)

(73) Assignee: Tencent Music Entertainment Technology (Shenzhen) Co., Ltd., Guangdong (CN)

(*) Notice: Subject to any disclaimer, the term of this patent is extended or adjusted under 35 U.S.C. 154(b) by 237 days.

(21) Appl. No.: 17/748,494

(22) Filed: May 19, 2022

(65) Prior Publication Data

US 2022/0277040 A1    Sep. 1, 2022

Related U.S. Application Data

(63) Continuation of application No. PCT/CN2020/128751, filed on Nov. 13, 2020.

(30) Foreign Application Priority Data

Nov. 22, 2019 (CN) .......................... 201911155290.6

(51) Int. Cl.
*G06F 16/65* (2019.01)
*G10H 1/36* (2006.01)

(52) U.S. Cl.
CPC .............. *G06F 16/65* (2019.01); *G10H 1/36* (2013.01); *G10H 2210/005* (2013.01); *G10H 2210/036* (2013.01); *G10H 2250/311* (2013.01)

(58) Field of Classification Search
CPC .......... G06F 3/167; G06F 16/65; G06F 16/68; G06F 16/639; G06F 18/2415;
(Continued)

(56) References Cited

U.S. PATENT DOCUMENTS 5,450,522 A * 9/1995 Hermansky ......... G10L 21/0208
704/205
5,677,990 A * 10/1997 Junqua .................. G10L 15/197
704/255
(Continued)

FOREIGN PATENT DOCUMENTS

CN        109785850 A     5/2019
CN        109885713 A     6/2019
(Continued)

OTHER PUBLICATIONS

International Search Report issued in corresponding international application No. PCT/CN2020/128751 dated Feb. 18, 2021, 11 pages.

*Primary Examiner* — Gerald Gauthier
(74) *Attorney, Agent, or Firm* — IP Spring

(57) ABSTRACT

An accompaniment classification method and apparatus is provided. The method includes the following. A first type of audio features of a target accompaniment is obtained (S301, S401). Data normalization is performed on each kind of audio features in the first type of audio features of the target accompaniment to obtain a first feature-set of the target accompaniment and the first feature-set is input into a first classification model for processing (S302, S402). A first probability value output by the first classification model for the first feature-set is obtained (S303, S403). An accompaniment category of the target accompaniment is determined to be a first category of accompaniments when the first probability value is greater than a first classification threshold (S404). The accompaniment category of the target accompaniment is determined to be other categories of accompaniments when the first probability value is less than or equal to the first classification threshold.

17 Claims, 5 Drawing Sheets

(58) Field of Classification Search
CPC .... G06F 3/165; G06F 16/5866; G06F 16/634;
G06F 16/685; G06F 17/153; G06N 3/045;
G06N 3/08; G06N 3/082; G06N 3/084;
G10H 1/0025; G10H 1/125; G10H 1/36;
G10H 1/38; G10H 1/383; G10H 1/44;
G10H 2210/005; G10H 2210/036; G10H
2250/311; G10L 15/08; G10L 15/26;
G10L 17/26; G10L 19/02; G10L 25/45;
G10L 13/033; G10L 13/08; G10L 15/02;
G10L 15/197; G10L 15/20; G10L 17/24;
G10L 21/0208; G10L 25/69; G10L 25/78;
Y02P 90/30; A63F 13/54; G09B 19/06
See application file for complete search history.

(56) References Cited

U.S. PATENT DOCUMENTS

| | | | | |
|---|---|---|---|---|
| 10,600,398 | B2* | 3/2020 | Pachet | G10H 1/40 |
| 10,790,919 | B1* | 9/2020 | Kolen | G06F 3/165 |
| 10,825,470 | B2* | 11/2020 | Li | G10L 25/78 |
| 10,963,781 | B2* | 3/2021 | Barkan | G06F 16/639 |
| 11,947,593 | B2* | 4/2024 | Jati | G06F 16/634 |
| 2003/0191640 | A1* | 10/2003 | Gemello | G10L 15/02 |
| | | | | 704/231 |
| 2007/0203694 | A1* | 8/2007 | Chan | G10L 25/69 |
| | | | | 704/E19.002 |
| 2008/0097754 | A1* | 4/2008 | Goto | G10L 15/26 |
| | | | | 704/214 |
| 2008/0168892 | A1* | 7/2008 | Uehara | G10H 1/36 |
| | | | | 84/610 |
| 2009/0258333 | A1* | 10/2009 | Yu | G09B 19/06 |
| | | | | 434/157 |
| 2011/0125500 | A1* | 5/2011 | Talwar | G10L 17/26 |
| | | | | 704/251 |
| 2011/0191101 | A1* | 8/2011 | Uhle | G10L 21/0208 |
| | | | | 704/205 |
| 2011/0282663 | A1* | 11/2011 | Talwar | G10L 15/20 |
| | | | | 704/233 |
| 2011/0282668 | A1* | 11/2011 | Stefan | G10L 13/033 |
| | | | | 704/266 |
| 2012/0203776 | A1* | 8/2012 | Nissan | G06F 16/685 |
| | | | | 707/E17.014 |
| 2013/0124200 | A1* | 5/2013 | Mysore | G10L 15/20 |
| | | | | 704/211 |
| 2014/0019135 | A1* | 1/2014 | Talwar | G10L 13/08 |
| | | | | 704/E13.011 |
| 2014/0109752 | A1* | 4/2014 | Hilderman | G10H 1/44 |
| | | | | 84/613 |
| 2016/0210951 | A1* | 7/2016 | Rutledge | G10H 1/38 |
| 2016/0247496 | A1* | 8/2016 | Pachet | G10H 1/383 |
| 2017/0084261 | A1* | 3/2017 | Watanabe | G10H 1/0025 |
| 2017/0140260 | A1* | 5/2017 | Manning | G06N 3/045 |
| 2017/0193362 | A1* | 7/2017 | Cremer | G06N 3/045 |
| 2017/0372725 | A1* | 12/2017 | Khoury | G10L 25/45 |
| 2018/0046898 | A1* | 2/2018 | Lo | G06F 17/153 |
| 2018/0276540 | A1* | 9/2018 | Xing | G06N 3/084 |
| 2018/0293969 | A1* | 10/2018 | Zhao | G10H 1/125 |
| 2018/0349495 | A1* | 12/2018 | Zhao | G10L 15/26 |
| 2019/0073560 | A1* | 3/2019 | Matei | G06N 3/08 |
| 2019/0080238 | A1* | 3/2019 | Wang | G06N 3/082 |
| 2019/0333498 | A1 | 10/2019 | Xu et al. | |
| 2019/0347357 | A1* | 11/2019 | Murali | G06F 16/5866 |
| 2020/0306641 | A1* | 10/2020 | Kolen | A63F 13/54 |
| 2020/0349925 | A1* | 11/2020 | Shahid | G10L 15/08 |
| 2020/0349927 | A1* | 11/2020 | Stoimenov | G10L 17/24 |
| 2021/0055796 | A1* | 2/2021 | Mansbridge | G06F 3/167 |
| 2021/0134307 | A1* | 5/2021 | Murmann | G10L 19/02 |
| 2022/0277040 | A1* | 9/2022 | Xu | G10H 1/36 |

FOREIGN PATENT DOCUMENTS

| | | |
|---|---|---|
| CN | 109961803 A | 7/2019 |
| CN | 110147711 A | 8/2019 |
| CN | 110739006 A | 1/2020 |
| CN | 111061909 A | 4/2020 |

* cited by examiner

ACCOMPANIMENT CLASSIFICATION METHOD AND APPARATUS

CROSS-REFERENCE TO RELATED APPLICATION(S)

This application is a continuation under 35 U.S.C. § 120 of International Patent Application No. PCT/CN2020/128751, filed on Nov. 13, 2020, which claims priority under 35 U.S.C. § 119(a) and/or PCT Article 8 to Chinese Patent Application No. 201911155290.6, filed on Nov. 22, 2019, the entire disclosure of which are hereby incorporated by reference

TECHNICAL FIELD

This disclosure relates to the technical field of computers, and more particularly to an accompaniment classification method and apparatus.

BACKGROUND

An accompaniment refers to instrumental performance that accompanies and complements singing. An accompaniment is of great value for people to appreciate, sing, and play songs. At present, due to the limitation of accompaniment recording equipment and/or accompaniment recording level of recording personnel, the quality of accompaniments in the market is uneven. In addition, a large number of old songs in the market have been released for a long time, and accompaniments were not recorded at the beginning or lost, so original accompaniments of these old songs are unable to be obtained currently. Therefore, people can only obtain non-original accompaniments of these old songs through manual re-making or silencing technologies such as sound-source separation. However, if accompaniments of these old songs are made manually, the cost is high and the quantity is scarce, but the accompaniment quality is high; and if these old songs are processed through a silencing technology, the cost is low and the quantity is large, but the quality is poor.

Therefore, the above reasons lead to uneven quality of accompaniments in the market, and it is relatively difficult to classify these accompaniments with uneven quality, and current manual classification is inefficient and costly.

SUMMARY

Disclosed herein are implementations of an accompaniment classification method and apparatus, which can quickly and effectively classify accompaniments, improve efficiency of accompaniment classification, and reduce labor costs.

In a first aspect, an accompaniment classification method is provided in implementations of the present disclosure, the method includes the following.

A first type of audio features of a target accompaniment is obtained, where the first type of audio features includes at least one kind of audio features. Data normalization is performed on each kind of audio features in the first type of audio features of the target accompaniment to obtain a first feature-set of the target accompaniment, where the first feature-set includes at least one kind of audio features. The first feature-set is input into a first classification model for processing, where the first classification model is a convolutional neural network model. A first probability value output by the first classification model for the first feature-set is obtained. An accompaniment category of the target accompaniment is determined to be a first category of accompaniments when the first probability value is greater than a first classification threshold. The accompaniment category of the target accompaniment is determined to be other categories of accompaniments when the first probability value is less than or equal to the first classification threshold.

In a second aspect, an electronic device is provided in implementations of the present disclosure. The electronic device includes a processor and a memory, the processor is coupled with the memory, the memory is configured to store computer programs, the computer programs include program instructions, and the processor is configured to invoke the program instructions to perform the following.

A first type of audio features of a target accompaniment is obtained, where the first type of audio features includes at least one kind of audio features. Data normalization is performed on each kind of audio features in the first type of audio features of the target accompaniment to obtain a first feature-set of the target accompaniment, where the first feature-set includes at least one kind of audio features. The first feature-set is input into a first classification model for processing, where the first classification model is a convolutional neural network model. A first probability value output by the first classification model for the first feature-set is obtained. An accompaniment category of the target accompaniment is determined to be a first category of accompaniments when the first probability value is greater than a first classification threshold. The accompaniment category of the target accompaniment is determined to be other categories of accompaniments when the first probability value is less than or equal to the first classification threshold.

In a third aspect, a non-transitory computer-readable storage medium storing a computer program is provided in implementations of the present disclosure, the computer program includes program instructions which, when executed by a processor, cause the processor to execute the accompaniment classification method as described in the first aspect.

DETAILED DESCRIPTION

The following will describe technical solutions of implementations of the present disclosure with reference to the accompanying drawings. Apparently, implementations described herein are some implementations of the present disclosure, rather than all implementations, of the present disclosure. Based on the implementations of the present disclosure described herein, all other implementations obtained by those of ordinary skill in the art without creative effort shall fall within the protection scope of the present disclosure.

For ease of understanding, an accompaniment and an accompaniment category of the accompaniment will be briefly introduced first in the present disclosure. Accompaniment is a musical term that refers to instrumental performance that accompanies and complements singing. Accompaniment categories of accompaniments can be distinguished from different perspectives, such as for classification by quality, accompaniment categories can be divided into high-quality accompaniments, low-quality accompaniments, and vocal-cut accompaniments, etc. The high-quality accompaniments can refer to accompaniments with higher audio quality. Objectively, the high-quality accompaniments can be reflected in a high sampling rate, a large code rate, and rich spectrum details. Subjectively, the high-quality accompaniments can be reflected in rich and full listening sense. The low-quality accompaniments can refer to accompaniments with lower audio quality. Objectively, the low-quality accompaniments can be reflected in a low sampling rate, a small code rate, and lack of spectral details. Subjectively, the low-quality accompaniments can be reflected in poor and muffled listening sense, etc. The vocal-cut accompaniments can refer to removing vocals in an original song to a certain extent through technical means such as vocal separation, so as to obtain an accompaniment with weaker vocals and stronger instrumental sounds. In terms of subjective sense of listening, the vocal-cut accompaniments include higher-quality vocal-cut accompaniments with continuous vocals and complete and pleasant instrumental sounds, and lower-quality vocal-cut accompaniments with intermittent vocals and muffled and unpleasant instrumental sounds.

In some possible implementations, a first category of accompaniments in this disclosure may be high-quality accompaniments, a second category of accompaniments may be low-quality accompaniments, a third category of accompaniments may be high-quality vocal-cut accompaniments, a fourth category of accompaniments may be medium-quality vocal-cut accompaniments, and a fifth category of accompaniments may be low-quality vocal-cut accompaniments.

Figure 1:
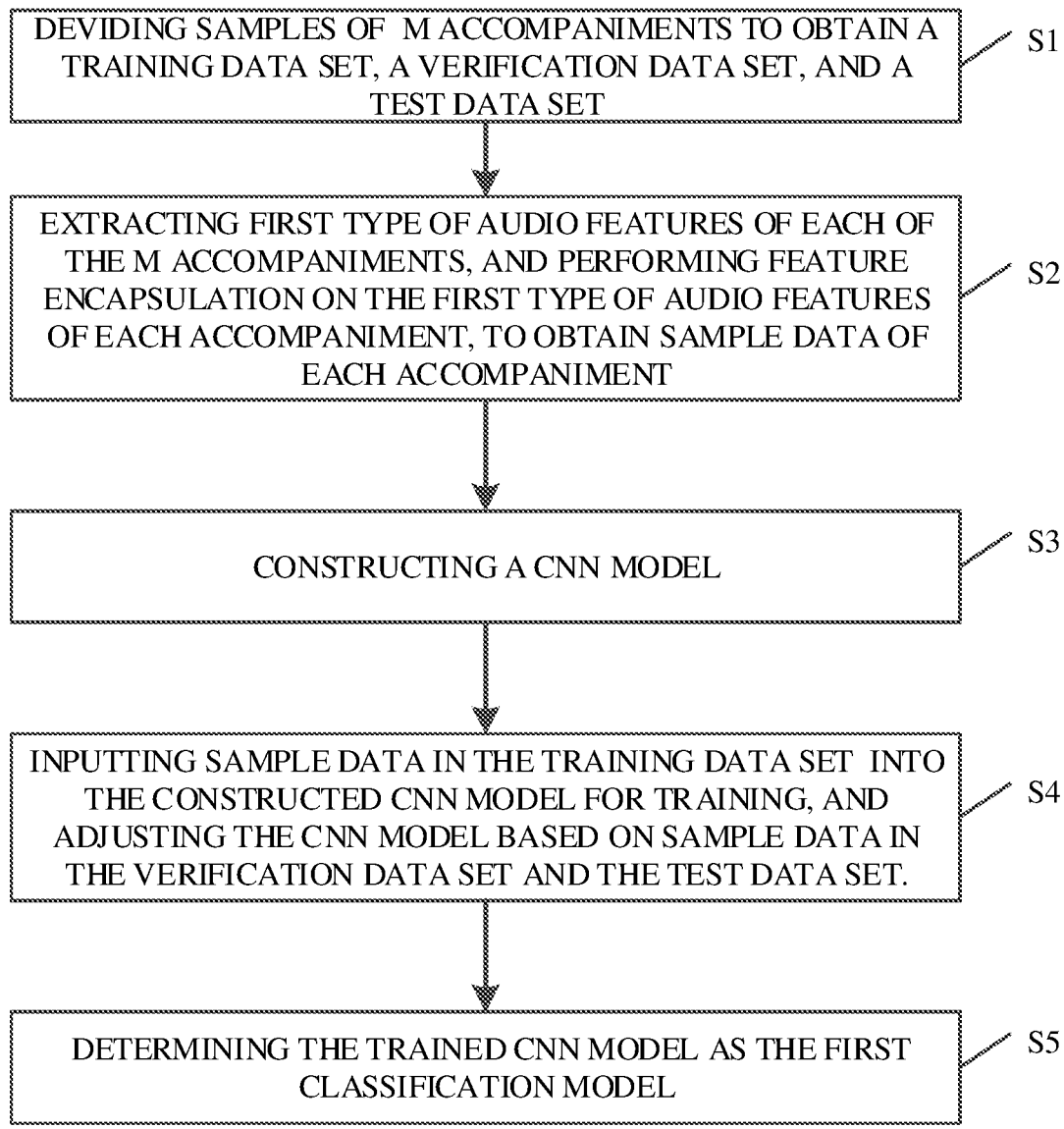
FIG. 1 is a schematic flow chart illustrating a method for generating a first classification module provided in implementations of the present disclosure.

A first classification model involved in the present disclosure may be a pre-trained convolutional neural network (CNN) model. Reference can be made to FIG. 1, which is a schematic flow chart illustrating a method for generating the first classification module provided in implementations of the present disclosure. The method for generating the first classification module includes the following.

At S1, samples of M accompaniments are divided to obtain a training data set, a verification data set, and a test data set.

In some possible implementations, formats, sizes, and numbers of channels of the M accompaniments are not limited, such as formats of mp3, flac, wav, ogg, etc., monophonic, dual-channel, multi-channel, etc. A user can manually mark each of the M accompaniments. The first category of accompaniments (that is, high-quality accompaniments), are marked with classification label "1"; and other categories of accompaniments (all categories of accompaniments except the first category of accompaniments, that is, low-quality accompaniments, high-quality vocal-cut accompaniments, medium-quality vocal-cut accompaniments, and low-quality vocal-cut accompaniments) are marked with classification label "0". The electronic device may divide the samples of the M accompaniments according to a preset division ratio to obtain the training data set, the verification data set, and the test data set. For example, the preset division ratio is 80:10:10, and M=1000. The electronic device can randomly select M*80%=1000*80%=800 accompaniments from the M accompaniments as data of the training data set, then randomly select M*10%=1000*10%=100 accompaniments from the remaining M*20%=1000*20%=200 accompaniments as the data of the verification data set, and finally determine remaining M*10%=1000*10%=100 accompaniments in the M accompaniments as the data of the test data set. The training data set can be used for training of the CNN model; the verification data set can be used to judge accuracy of a trained model during the training of the CNN model; and the test data set can be used to examine a generalization ability of a model after the training of the CNN model is completed.

At S2, extract first type of audio features of each of the M accompaniments, and perform feature encapsulation on the first type of audio features of each accompaniment, to obtain sample data of each accompaniment.

In some possible implementations, the electronic device may extract the first type of audio features of each of the M accompaniments through an open-source algorithm library. The first type of audio features may include at least one kind of: Mel spectral features, relative spectral transform-perceptual linear prediction (RASTA-PLP) features, or perceptual linear prediction (PLP) coefficients. Each kind of audio features may include features or data of multiple dimensions. For any accompaniment j in the M accompaniments, the electronic device may perform data normalization (such as zero-mean normalization) on each kind of audio features in the first type of audio features of accompaniment j and encapsulate them with a classification label of accompaniment j as sample data of accompaniment j, so as to obtain sample data of each of the M accompaniments. The z-score (zero-mean) normalization can be calculated through $x'=(x-u)/\sigma$, x represents a feature or a piece of data in one kind of audio features, and x' represents a result of x being normalized through z-score, that is, a piece of data in a piece of sample data, u represents a mean value of one kind of audio features, and $\sigma$ represents a standard deviation of one kind of audio features. Optionally, when the electronic device extracts the first type of audio features of each of the M accompaniments through the open-source algorithm library, the electronic device may first perform frame division on each of the M accompaniments to obtain multiple audio frames of each accompaniment, and then extract first type of audio features of each audio frame of each accompaniment. The first type of audio features of each accompaniment may refer to a set of first type of audio features of audio frames included in each accompaniment.

For example, taking any accompaniment j in the M accompaniments as an example, supposing that the first type of audio features includes Mel spectral features, RASTA-PLP features, and PLP coefficients, accompaniment j has 2000 audio frames, and the first type of audio features of accompaniment j is $Y_j$. $Y_j=(A_j, B_j, C_j)$, $A_j$ represents Mel spectral features of accompaniment j, $A_j=(A_{j1}, A_{j2}, \ldots, A_{ji} \ldots, A_{j2000})$, $A_{ji}$ represents Mel spectral features of the $i^{th}$ audio frame of accompaniment j; $B_j$ represents RASTA-PLP features of accompaniment j, $B_j=(B_{j1}, B_{j2}, \ldots, B_{ji} \ldots, B_{j2000})$, $B_{ji}$ represents RASTA-PLP features of the $i^{th}$ audio frame of accompaniment j; and $C_j$ represents PLP coefficients of accompaniment j, $C_j=(C_{j1}, C_{j2}, \ldots, C_{ji} \ldots,$ $C_{j2000}$), $C_{ji}$ represents PLP coefficients of the $i^{th}$ audio frame of accompaniment j. $A_j$, $B_j$, and $C_j$ all include data of multiple dimensions. The electronic device performs z-score normalization on data of each dimension in $A_j$, $B_j$, and $C_j$, and then encapsulates them with classification label $L_j$ of accompaniment j as sample data $Y'_j$ of accompaniment j. $Y'_j=[(a_j, b_j, c_j), L_j]$, where $a_j$ is a result of z-score normalization of $A_j$, $b_j$ is a result of z-score normalization of $B_j$, and $c_j$ is a result of z-score normalization of $C_j$.

At S3. a CNN model is constructed.

In some possible implementations, the electronic device can build a multi-layer (e.g., 8-layer) convolutional neural network model.

Figure 2:
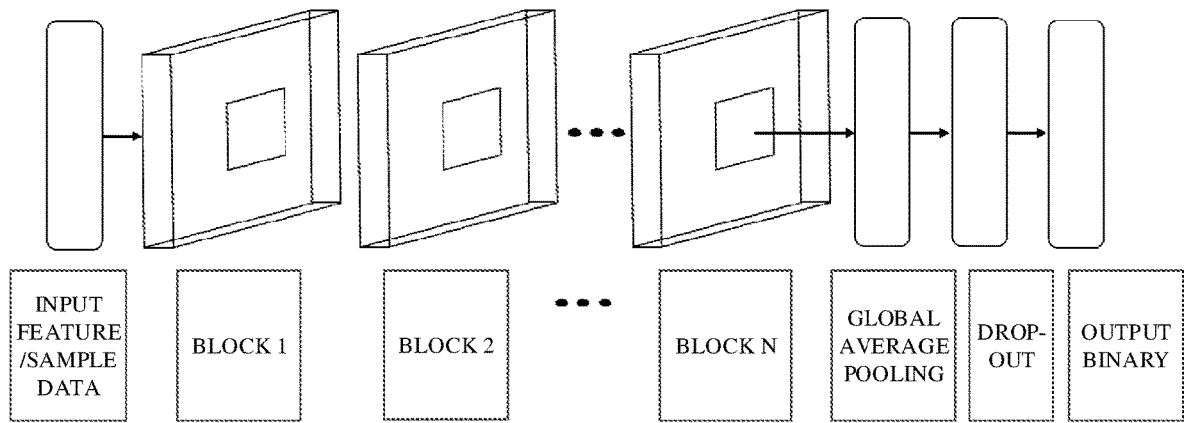
FIG. 2 is a schematic diagram illustrating a convolutional neural network model.

Reference can be made to FIG. 2, which is a schematic diagram illustrating a CNN model provided in implementations of the present disclosure. As illustrated in FIG. 2, in a training phase, input of the CNN model is sample data, an activation function is sigmoid, and each layer in the CNN model can be a block. Global average pooling is performed on an output layer of the CNN model to obtain a two-dimensional output of the number of samples and the number of features, and then dropout is adopted to randomly disconnect an input neuron with a certain probability each time a parameter is updated during a training process, so as to prevent overfitting.

At S4, sample data in the training data set is input into the constructed CNN model for training, and the CNN model is adjusted based on sample data in the verification data set and the test data set.

In some possible implementations, the training data set includes K pieces of sample data, one piece of sample data corresponds to one accompaniment, K=M*n %, n % can be a division ratio corresponding to the training data set, for example, n %=80%, and K=M*80%. The electronic device can obtain each sample data in the training data set, and can input sample data in the training data set (e.g., $Y'=[Y'_1, Y'_2, \ldots, Y'_K]$, Y' represents the training data Set, $Y'_K$ represents the $K_{th}$ sample data) into the constructed CNN model for training. The accuracy of the CNN model is judged based on sample data in the verification data set during the training process. After the training is completed (that is, when the CNN model converges), the generalization ability of the trained CNN model is examined and the trained CNN model is adjusted based on sample data in the test data set. During the training process, a mean-square error can be used as a loss function, a mean-absolute error can be used as an evaluation function, and convergence of the CNN model can mean that a value of the loss function is within a first preset range, and a value of the evaluation function is within the second preset range.

At S5, the trained CNN model is determined as the first classification model.

In some possible implementations, the electronic device may determine the trained CNN model as the first classification model. The trained CNN model may refer to the CNN model trained with the training data set and adjusted with the verification data set and the test data set.

In implementations of the present disclosure, the electronic device divides the samples of the M accompaniments to obtain the training data set, the verification data set, and the test data set, extracts the first type of audio features of each of the M accompaniments, performs feature encapsulation on the first type of audio features of each accompaniment to obtain the sample data of each accompaniment, constructs the CNN model, inputs the sample data in the training data set into the constructed CNN model for training, adjusts the CNN model based on sample data in the verification data set and the test data set, and finally determines the trained CNN model as the first classification model. In implementations of the present disclosure, accompaniment categories of accompaniments can be automatically classified based on the obtained first classification model.

The accompaniment classification method and apparatus provided in the present disclosure will be introduced below with reference to FIG. 3 to FIG. 6.

Figure 3:
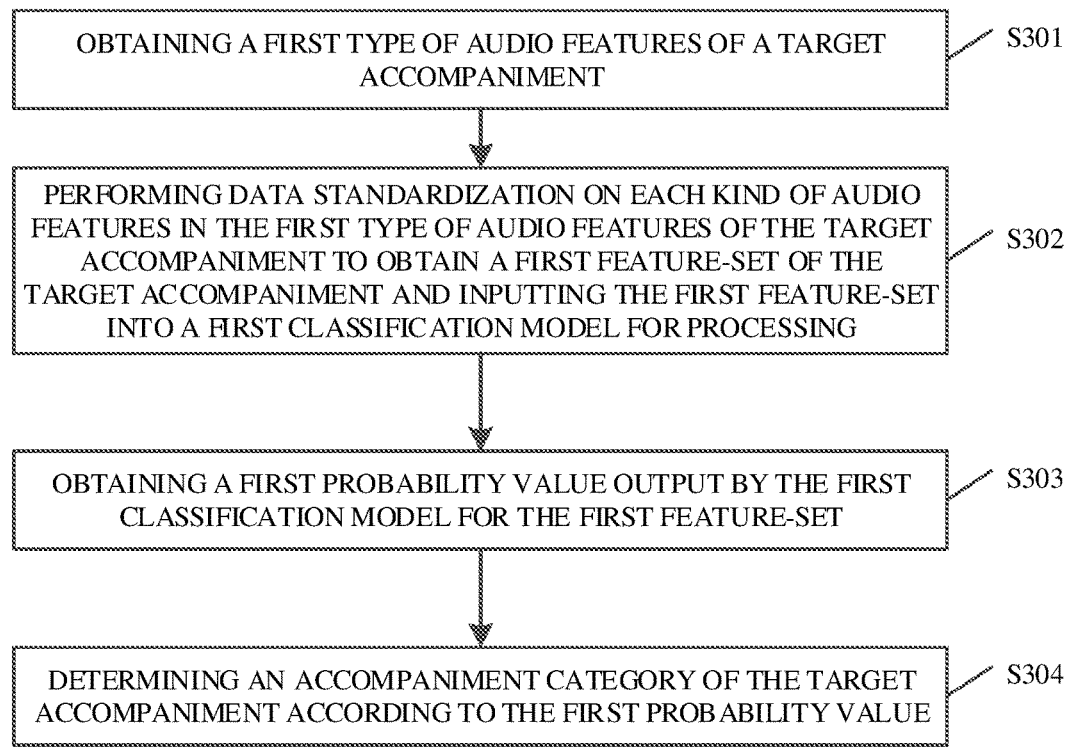
FIG. 3 is a schematic flow chart illustrating an accompaniment classification method provided in implementations of the present disclosure.

Reference is made to FIG. 3, which is a schematic flow chart illustrating an accompaniment classification method provided in implementations of the present disclosure. As illustrated in FIG. 3, the method can include the following.

At S301, a first type of audio features of a target accompaniment is obtained.

In some possible implementations, the first type of audio features may include at least one kind of audio features among: Mel spectral features, RASTA-PLP features, and PLP coefficients. Each kind of audio features may include features or data of multiple dimensions. The electronic device may receive the target accompaniment (or an accompaniment to be classified) input by a user, and may perform frame division on the target accompaniment to obtain multiple audio frames. The electronic device can separately extract first type of audio features of each of the multiple audio frames. Since the target accompaniment is a collection of multiple audio frames, extracting the first type of audio features of the target accompaniment is to extract a set of first type of audio features of multiple audio frames. The first type of audio features can be obtained through an open-source algorithm library. The Mel spectral features can be used to reflect characteristics such as a sampling rate, a code rate, and spectral details of an accompaniment, and the RASTA-PLP features can be used to reflect the presence and/or strength of vocals in the accompaniment.

For example, it is assumed that 2000 audio frames are obtained after the electronic device performs frame division on the target accompaniment (indicating that these 2000 audio frames constitute the target accompaniment), the first type of audio features includes three kinds of audio features: Mel spectral features, RASTA-PLP features, and PLP coefficients. It is assumed that the Mel spectral features are denoted by A, the RASTA-PLP features are denoted by B, and the PLP coefficients are denoted by C. The electronic device can separately extract the first type of audio features $(A_i, B_i, C_i)$ of each of the 2000 audio frames, i represents the $i^{th}$ audio frame of the target accompaniment, $A_i$ represents the Mel spectral features of the $i^{th}$ audio frame, $B_i$ represents the RASTA-PLP features of the $i^{th}$ audio frame, and $C_i$ represents the PLP coefficients of the $i^{th}$ audio frame. The electronic device takes a set of the first type of audio features of the 2000 audio frames as the first type of audio features of the target accompaniment, that is, the first type of audio features of the target accompaniment is $X_1$, and $X_1=[(A_1, A_2, \ldots, A_i, \ldots, A_{2000}), (B_1, B_2, \ldots, B_i, \ldots, B_{2000}), (C_1, C_2, \ldots, C_i, \ldots, C_{2000})]$.

At S302: data normalization is performed on each kind of audio features in the first type of audio features of the target accompaniment to obtain a first feature-set of the target accompaniment and the first feature-set is input into a first classification model for processing.

In some possible implementations, the electronic device can perform data normalization on each kind of audio features in the first type of audio features of the target accompaniment, to obtain the first feature-set of the target accompaniment. The first feature-set includes at least one kind of feature elements, and kinds of the feature elements included in the first feature-set is the same as kinds of audio features included in the first type of audio features, that is, kinds of feature elements in the first feature-set correspond to kinds of audio features in the first type of audio features in a one-to one correspondence, and one kind of feature elements in the first feature-set is obtained from one kind of audio features in the first type of audio features after data normalization. For example, the first type of audio features includes three kinds of audio features: A, B, and C, and the first feature-set includes feature elements of the three kinds of audio features of A, B, and C. After obtaining the first feature-set of the target accompaniment, the electronic device may obtain the first classification model, and input the first feature-set into the first classification model for processing. The first classification model may be an 8-layer CNN model, and an activation function of the first classification model may be a sigmoid function. The first classification model can be trained based on first types of audio features and first classification labels of at least two categories of accompaniments, and the first classification labels can include a classification label of the first category of accompaniments and a classification label of at least one other category of accompaniments. The first category labels may be set by the user, for example, "1" in the first category labels is used to identify the first category of accompaniments (such as high-quality accompaniments), and "0" is used to identify other categories of accompaniments (all categories other than the first category of accompaniments, such as low-quality accompaniment, high-quality vocal-cut accompaniments, medium-quality vocal-cut accompaniments, and/or low-quality vocal-cut accompaniments). The data normalization may include at least one of following normalization methods: min-max normalization, zero-mean normalization (z-score normalization), or decimal scaling normalization.

In some possible implementations, each kind of audio features in the first type of audio features includes features (data) of multiple dimensions. For each kind of audio features in the first type of audio features of the target accompaniment, data normalization is performed on a feature (data) of each dimension of each kind of audio features based on zero-score normalization, to obtain the first feature-set of the target accompaniment. Each kind of feature elements in the first feature-set can include multiple elements, and elements of one kind of feature elements in the first feature-set correspond to features of one dimension of one kind of audio features in the first type of audio features in a one-to one correspondence.

For example, suppose the first type of audio features of the target accompaniment is represented by $X_1$, $X1=[(A_1, A_2, \ldots, A_i, \ldots, A_{2000}), (B_1, B_2, \ldots, B_i, \ldots, B_{2000}), (C_1, C_2, \ldots, C_i, \ldots, C_{2000})]$, Ai represents Mel spectral features of the $i^{th}$ audio frame of the target accompaniment, $B_i$ represents RASTA-PLP features of the $i^{th}$ audio frame of the target accompaniment, and $C_i$ represents PLP coefficients of the $i^{th}$ audio frame of the target accompaniment. A corresponds to one kind of feature elements a, B corresponds to another kind of feature elements b, and C corresponds to yet another kind of feature elements c. A includes a 128-dimensional feature (data), $A_i$ is a 128*1 matrix, A is a 128*n matrix, and then a includes 128*n elements. B includes a 39-dimensional feature (data), Bi is a 39*1 matrix, B is a 39*n matrix, and then b includes 39*n elements. C includes a 13-dimensional feature (data), $C_i$ is a 13*1 matrix, C is a 13*n matrix, and then c includes 13*n elements. n can be the number of audio frames obtained after the target accompaniment is subjected to frame division, that is, n=2000. The electronic device can calculate mean $u_A$ and standard deviation $\sigma_A$ of $(A_1, A2, \ldots, A_i, \ldots, A_{2000})$, calculate mean $u_B$ and standard deviation $\sigma_B$ of $(B_1, B_2, \ldots, B_i, \ldots, B_{2000})$, and calculate mean $u_C$ and standard deviation $\sigma_C$ of $(C_1, C_2, \ldots, Ci, \ldots, C_{2000})$. The electronic device performs z-score normalization on each feature (data) in $(A_1, A_2, \ldots, A_i, \ldots, A_{2000})$ based on mean $u_A$ and standard deviation $\sigma_A$ to obtain a kind of feature elements $(a_1, a_2, \ldots, a_i, \ldots, a_{2000})$; perform z-score normalization on each feature (data) in $(B_1, B_2, \ldots, B_i, \ldots, B_{2000})$ based on mean $u_B$ and standard deviation $\sigma_B$ to obtain another kind of feature elements $(b_1, b_2, \ldots, b_i, \ldots, b_{2000})$; and then perform z-score normalization on each feature (data) in $(C_1, C_2, \ldots, C_i, \ldots, C_{2000})$ based on mean $u_C$ and standard deviation $\sigma_C$ to obtain another kind of feature elements $(c_1, c_2, \ldots, c_i, \ldots, c_{2000})$. The electronic device encapsulates feature elements $(a_1, a_2, \ldots, a_i, \ldots, a_{2000})$, $(b_1, b_2, \ldots, b_i, \ldots, b_{2000})$, and $(c_1, c_2, \ldots, c_i, \ldots, c_{2000})$ as the first feature-set $X1'=[(a_1, a_2, \ldots, a_i, \ldots, a_{2000}), (b_1, b_2, \ldots, b_i, \ldots, b_{2000}), (c_1, c_2, \ldots, c_i, \ldots, c_{2000})]$ of the target accompaniment. The size of X1' is the same as that of X1.

Since $A_i$ is a 128*1 matrix, $a_i$ obtained by performing z-score normalization on features (data) in $A_i$ is also a 128*1 matrix, and the features in $A_i$ correspond to the elements in $a_i$ in a one-to-one correspondence, that is, a feature corresponds to an element. Similarly, $b_i$ is also a 39*1 matrix, and features in $B_i$ correspond to the elements in $b_i$ in a one-to-one correspondence; and $c_i$ is also a 13*1 matrix, and features in $C_i$ correspond to elements in $c_i$ in a one-to-one correspondence. A calculation method of the z-score normalization is: $x'=(x-u)/\sigma$, x represents a feature or a piece of data, x' represents a result of a feature or a piece of data after z-score normalization, that is, an element in the first feature-set, u represents a mean of the features or data, and $\sigma$ represents a standard deviation of the features or data.

At S303, a first probability value output by the first classification model for the first feature-set is obtained.

In some possible implementations, after the electronic device inputs the first feature-set into the first classification model, the first classification model can predict a probability value that the target accompaniment is the first category of accompaniments based on the first feature-set, and can output the probability value. The electronic device may obtain the probability value output by the first classification model, and determine the probability value output by the first classification model as the first probability value. The first probability value ranges in [0, 1]. If "1" in the first classification labels is used to identify the first category of accompaniments, and "0" is used to identify other categories of accompaniments (all categories except the first category of accompaniments), the closer the probability value output by the first classification model is to 1, the higher a probability that the accompaniment category of the target accompaniment is the first category of accompaniments; on the contrary, the closer the probability value output by the first classification model is to 0, the less the probability that the accompaniment category of the target accompaniment is the first category of accompaniments. Similarly, if "0" in the first classification labels is used to identify the first category of accompaniments, and "1" is used to identify other categories of accompaniments (all categories except the first category of accompaniments), the closer the probability value output by the first classification model is to 1, the less the probability that the accompaniment category of the target accompaniment is the first category of accompaniments; on the contrary, the closer the probability value output by the first classification model is to 0, the higher the probability that the accompaniment category of the target accompaniment is the first category of accompaniments.

At S304, the accompaniment category of the target accompaniment is determined according to the first probability value.

In some possible implementations, after obtaining the first probability value, the electronic device may obtain a preset first classification threshold, and compare the first probability value with the first classification threshold. If "1" in the first classification labels is used to identify the first category of accompaniments, and "0" is used to identify other categories of accompaniments (all categories except the first category of accompaniments), then when the first probability value is greater than the first classification threshold, the electronic device may determine the accompaniment category of the target accompaniment to be the first category of accompaniments; and when the first probability value is less than or equal to the first classification threshold, the electronic device may determine the accompaniment category of the target accompaniment to be other categories of accompaniments (not the first category of accompaniments). Similarly, If "0" in the first classification labels is used to identify the first category of accompaniments, and "1" is used to identify other categories of accompaniments (all categories except the first category of accompaniments), then when the first probability value is less than the first classification threshold, the electronic device may determine the accompaniment category of the target accompaniment to be the first category of accompaniments; and when the first probability value is greater than or equal to the first classification threshold, the electronic device may determine the accompaniment category of the target accompaniment to be other categories of accompaniments. Optionally, the electronic device may store the target accompaniment in a local disk after determining that the accompaniment category of the target accompaniment is the first category of accompaniments. The first classification threshold may be 0.5. The electronic device in implementations of the present disclosure determines the accompaniment category of the target accompaniment according to the first probability value output by the first classification model, which can realize automatic classification, quickly and effectively classify accompaniments, improve the efficiency of accompaniment classification, and reduce labor costs.

In implementations of the present disclosure, the electronic device obtains the first type of audio features of the target accompaniment, and then performs data normalization on each kind of audio features in the first type of audio features of the target accompaniment, so as to obtain the first feature-set of the target accompaniment. The electronic device inputs the first feature-set into the first classification model for processing, obtains the first probability value output by the first classification model for the first feature-set, and determines the accompaniment category of the target accompaniment according to the first probability value. As such, accompaniments can be classified quickly and effectively, the efficiency of accompaniment classification can be improved, and labor costs can be reduced.

Figure 4:
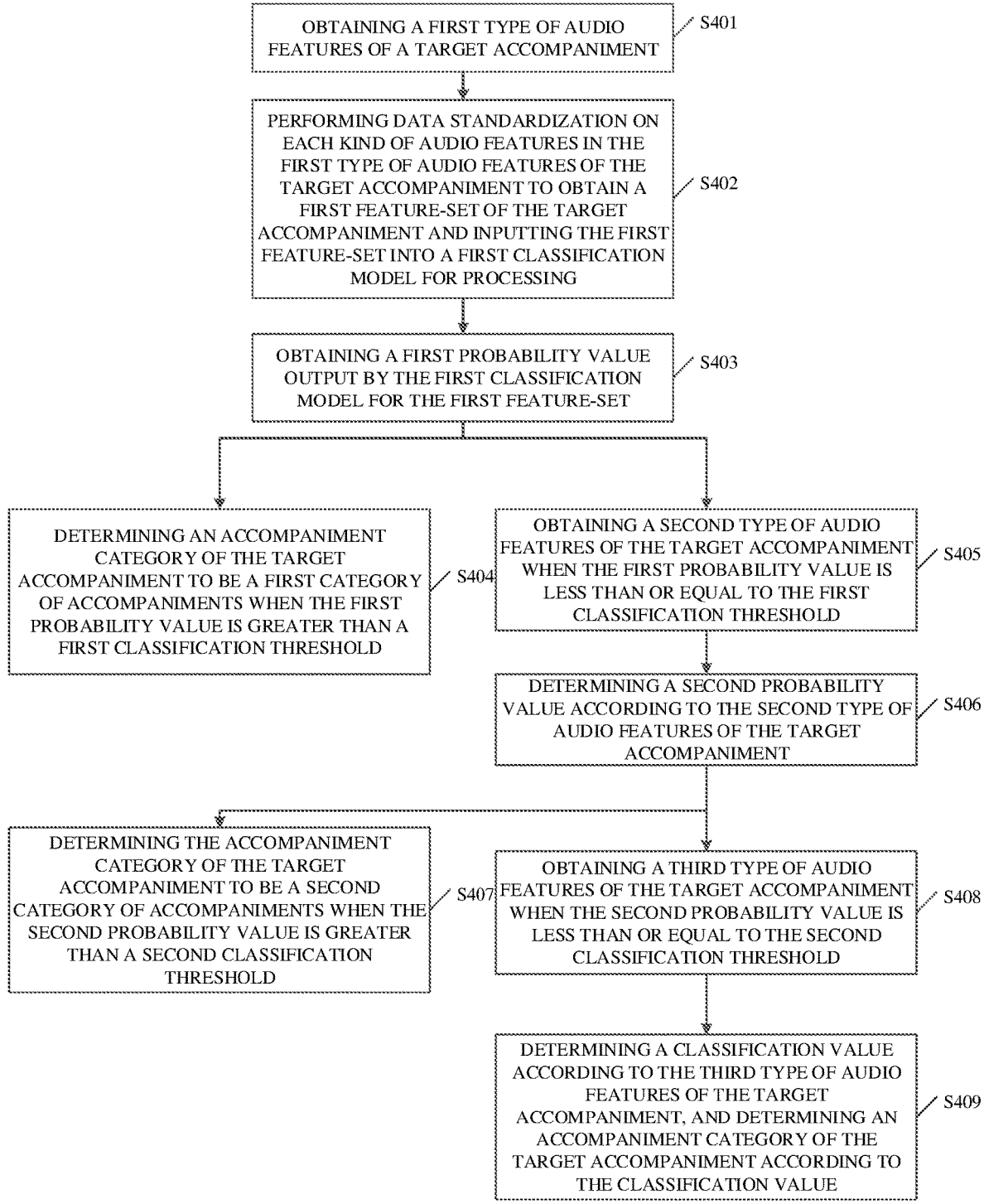
FIG. 4 is a schematic flow chart illustrating an accompaniment classification method provided in other implementations of the present disclosure.

Reference is made to FIG. 4, which is another schematic flow chart illustrating an accompaniment classification method provided in other implementations of the present disclosure. As illustrated in FIG. 4, the accompaniment classification method may include the following.

At S401, a first type of audio features of the target accompaniment is obtained.

At S402, data normalization is performed on each kind of audio features in the first type of audio features of the target accompaniment to obtain a first feature-set of the target accompaniment, and the first feature-set is input into a first classification model for processing At S403, a first probability value output by the first classification model for the first feature-set is obtained.

In some possible implementations, reference of implementations of operations at S401 to S403 in the implementations of the present disclosure can be made to the implementations of operations at S301 to S303 in FIG. 3, which will not be repeated here.

At S404, if the first probability value is greater than a first classification threshold, an accompaniment category of the target accompaniment is determined to be a first category of accompaniments.

In some possible implementations, the first classification model may be trained based on the first type of audio features and first classification labels of at least two categories of accompaniments, and the first classification labels may include a classification label of the first category of accompaniments and a class label of at least one other category of accompaniments. The first classification label may be set by the user. For ease of description, the following will take first classification label "1" for identifying the first category of accompaniments and first classification label "0" for identifying other categories of accompaniments as an example for description. When the first probability value is greater than the first classification threshold (e.g., 0.5), the electronic device may determine the accompaniment category of the target accompaniment to be the first category of accompaniments. Optionally, after determining that the accompaniment category of the target accompaniment is the first category of accompaniments, the electronic device may store the target accompaniment in a first storage space for subsequent use.

At S405, if the first probability value is less than or equal to the first classification threshold, a second type of audio features of the target accompaniment is obtained.

In some possible implementations, when the first probability value is less than or equal to the preset first classification threshold, it indicates that the accompaniment category of the target accompaniment is not the first category of accompaniments, and the electronic device can obtain the second type of audio features of the target accompaniment. The second type of audio features includes the first type of audio features, and the second type of audio features may further include at least one kind of: spectral entropy, first-order difference coefficients of the RASTA-PLP features, or second-order difference coefficients of the RASTA-PLP feature. Each kind of features can include data of multiple dimensions. The target accompaniment may be a collection of multiple audio frames, and the second type of audio features of the target accompaniment may be a set of second types of audio features of the multiple audio frames. The second type of audio features can be obtained through an open-source algorithm library. The spectral entropy can be used to reflect characteristics such as noise in an accompaniment and/or order/disorder of the accompaniment and the like; the first-order difference coefficients of the RASTA-PLP features can be used to reflect a temporal relationship between two adjacent audio frames (or voice frames); and the second-order difference coefficients of the RASTA-PLP features can be used to reflect a dynamic relationship among adjacent three audio frames (or voice frames).

In some possible implementations, when the first probability value is less than or equal to the preset first classification threshold, the electronic device may select a first accompaniment from the target accompaniment within a target time period, and perform frame division on the first accompaniment to obtain multiple first audio frames. The electronic device may extract second type of audio features of each of the multiple first audio frames. Since the first accompaniment is a collection of the multiple first audio frames, and the first accompaniment is a part of the target accompaniment, the second type of audio features of the target accompaniment may be a set of second type of audio features of the multiple first audio frames. In other words, the electronic device removes data of the target accompaniment before a minimum time point (e.g., the $30^{th}$ second) of the target time period. Since most of accompaniments are mainly pure accompaniments between 0 and the $30^{th}$ second, the quality of the pure accompaniments is relatively high, removal of the pure accompaniments can improve the accuracy of accompaniment classification. Optionally, if a time length of the target accompaniment is greater than the minimum time point of the target time period and less than the maximum time point of the target time period, then the electronic device can zero-fill the target accompaniment to make the time length of the target accompaniment equal to the maximum time point of the target time period. For example, the time length of the target accompaniment is 2 minutes, and the target time period is from the $30^{th}$ second to the second minute-and-$30^{th}$-second. The maximum time point of the target time period is the second minute-and-$30^{th}$-second, then the electronic device can add zero in 30 seconds after the second minute of the target accompaniment. As such, the first accompaniment selected includes a target accompaniment from the $30^{th}$ second to the second minute and zero from the second minute to the second minute-and-$30^{th}$-second.

In some possible implementations, when the first probability value is less than or equal to the preset first classification threshold, the electronic device may select audio frames within the target time period from the multiple audio frames included in the target accompaniment, extract the second type of audio features of each of audio frames in the target time period, and then determine a set of the second type of audio features of the audio frames in the target time period as the second type of audio features of the target accompaniment.

For example, suppose the target accompaniment has 2000 audio frames, the target time period is from the $30^{th}$ second to the second minute-and-$30^{th}$-second, and there are 1600 audio frames in the target time period, that is, the first accompaniment has 1600 audio frames, and the target accompaniment has 400 audio frames from 0 to the $30^{th}$ second. Suppose Mel spectral features are represented by A, RASTA-PLP features are represented by B, PLP coefficients are represented by C, spectral entropy is represented by D, first-order difference coefficients of the RASTA-PLP features are represented by E, and second-order difference coefficients of the RASTA-PLP features are represented by E'. Suppose the first type of audio features includes the Mel spectral features, the RASTA-PLP features, and the PLP coefficients; the second type of audio features includes the first type of audio features, the spectral entropy, the first-order difference coefficients of RASTA-PLP features, and the second-order difference coefficients of the RASTA-PLP features. The second type of audio features of the target accompaniment obtained by the electronic device is $X_2$, and $X_2=[(A_{401}, A_{402}, \ldots, A_i, \ldots, A_{2000}), (B_{401}, B_{402}, \ldots, B_i, \ldots, B_{2000}), (C_{401}, C_{402}, \ldots, C_i, \ldots, C_{2000}), (D_{401}, D_{402}, \ldots, D_i, \ldots, D_{2000}), (E_{401}, E_{402}, \ldots, E_i, \ldots, E_{2000}), (E'_{401}, E'_{402}, \ldots, E'_i, \ldots, E'_{2000})]$. $A_i$ represents the Mel spectral features of the $i^{th}$ audio frame in the 1600 audio frames, $B_i$ represents the RASTA-PLP features of the $i^{th}$ audio frame in the 1600 audio frames, and $C_i$ represents the PLP coefficients of the $i^{th}$ audio frame in the 1600 audio frames, $D_i$ represents the spectral entropy of the $i^{th}$ audio frame in the 1600 audio frames, $E_i$ represents the first-order difference coefficients of RASTA-PLP features of the $i^{th}$ audio frame in the 1600 audio frames, and $E_i'$ represents the second-order difference coefficients of RASTA-PLP features of the $i^{th}$ audio frame in the 1600 audio frames.

At S406: a second probability value is determined according to the second type of audio features of the target accompaniment.

In some possible implementations, after obtaining the second type of audio features of the target accompaniment, the electronic device may perform data normalization on each kind of audio features in the second type of audio features of the target accompaniment, so as to obtain a second feature-set of the target accompaniment. The second feature-set includes at least one kind of feature elements, and feature element types included in the second feature-set is the same as audio feature types included in the second type of audio features, that is, kinds of feature elements in the second feature-set correspond to kinds of audio features in the second type of audio features in a one-to one correspondence, that is, a feature element in the second feature-set is obtained from an audio feature in the second type of audio feature after data normalization. For example, the second type of audio features includes six kinds of audio features: A, B, C, D, E, E', then the second feature-set includes feature elements of the six kinds of audio features of A, B, C, D, E, E'. After obtaining the second feature-set of the target accompaniment, the electronic device may obtain a second classification model, and input the second feature-set into the second classification model for processing. The second classification model may predict a probability value of the target accompaniment being a second category of accompaniments based on the second feature-set, and may output the probability value. The electronic device may obtain the probability value output by the second classification model, and determine the probability value output by the second classification model as the second probability value.

The second classification model may be a 10-layer CNN model, and an activation function of the second classification model may be a softmax function. The second classification model may be trained based on second types of audio features and second types of classification labels of at least two categories of accompaniments. The second type of classification labels may include a classification label of the second category of accompaniments and a classification labels of at least one other category of accompaniments. The second classification label can be set by the user, for example, in the second classification labels, "1" is used to identify the second category of accompaniments (such as low-quality accompaniments), and "0" is used to identify other categories of accompaniments (all categories except the first category of accompaniments and the second category of accompaniments, such as good-quality vocal-cut accompaniments, medium-quality vocal-cut accompaniments, and/or low-quality vocal-cut accompaniments). The data normalization may include at least one normalization method of: min-max normalization, zero-mean normalization (z-score normalization), or decimal scaling normalization. A range of the second probability value ranges is [0, 1].

In some possible implementations, before the electronic device obtains the second classification model, the second classification model may be generated in advance. For a generation manner of the second classification model, reference may be made to implementations of operations in implementations in FIG. 1, specifically as follows.

(1), N accompaniments are selected from M accompaniments, and accompaniment categories of the N accompaniments are not the first category of accompaniments and include the second category of accompaniments. (2), divide samples of N accompaniments to obtain a training data set, a verification data sets, and a test data set. The user can manually mark each of the N accompaniments by marking the second category of accompaniments (i.e., low-quality accompaniments) with classification label "1", and marking other categories of accompaniments in these N accompaniments (all categories of accompaniments except the first category of accompaniments and the second category of accompaniments, namely high-quality vocal-cut accompaniments, medium-quality vocal-cut accompaniments, and low-quality vocal-cut accompaniments) with classification label "0". (3), each of the N accompaniments is preprocessed to obtain N second accompaniments. For example, for each of the N accompaniments, data before the first time point is removed, and an accompaniment in the N accompaniments whose time length is less than the second time point are zero-filled, to obtain the N second accompaniments. The first time point and the second time point collectively determine a time period, that is, the target time period. The first time point may be the minimum time point of the target time period, and the second time point may be the maximum time point of the target time period. (4), a second type of audio features of each of the N second accompaniments is extracted, and feature encapsulation is performed on the second type of audio features of each second accompaniment, to obtain sample data of each second accompaniment. The second type of audio features may include the first type of audio features, and may further include at least one kind of: spectral entropy, first-order difference coefficients of the RASTA-PLP features, or second-order difference coefficients of the RASTA-PLP features. (5), a second CNN model is constructed. The second CNN model may have 10 layers, and an activation function may be softmax. (6), sample data in the training data set obtained in step (4) is input into the constructed second CNN model for training, and the second CNN model is adjusted based on sample data in the verification data set and the test data set obtained in step (4). (7), the trained second CNN model is determined as the second classification model.

At S407, if the second probability value is greater than the second classification threshold, the accompaniment category of the target accompaniment is determined to be the second category of accompaniments.

In some possible implementations, for convenience of description, the following will take second classification label "1" for identifying the second category of accompaniments and second classification label "0" for identifying other categories of accompaniments as an example for description. After determining the second probability value, the electronic device may obtain a preset second classification threshold (e.g., 0.5), and may compare the second probability value with the second classification threshold. If the second probability value is greater than the second classification threshold, the electronic device may determine the accompaniment category of the target accompaniment to be the second category of accompaniments. Optionally, after determining that the accompaniment category of the target accompaniment is the second category of accompaniments, the electronic device may store the target accompaniment in a second storage space. In implementations of the present disclosure, when the accompaniment category of the target accompaniment is not the first category of accompaniments, the second type of audio features of the target accompaniment is extracted, and according to the second type of audio features of the target accompaniment, it is determined whether the accompaniment category of the target accompaniment is the second category of accompaniments, so as to further subdivide the accompaniment category of the target accompaniment to obtain a more detailed accompaniment category classification.

At S408, if the second probability value is less than or equal to the second classification threshold, a third type of audio features of the target accompaniment is obtained.

In some possible implementations, when the second probability value is less than or equal to the preset second classification threshold, it indicates that the accompaniment category of the target accompaniment is not the second category of accompaniments, and the electronic device may obtain the third type of audio features of the target accompaniment. The third type of audio features may include the second type of audio features, and may further include at least one kind of spectral roll-off, continuity features of harmonic intensity, or sudden silence features. Each kind of audio features may include data of multiple dimensions. The target accompaniment may be a collection of multiple audio frames, and the third type of audio features of the target accompaniment may be a set of third type of audio features of the multiple audio frames. The third type of audio features can be obtained through an open-source algorithm library. The spectral roll-off can be used to reflect characteristics of change of spectral energy of an accompaniment in frequency. The continuity features of harmonic intensity can be used to reflect continuity of fundamental frequency and harmonics of the accompaniment in time, and when harmonic energy of an accompaniment is more intermittent in time, the quality of the accompaniment is lower. The sudden silence features can be used to reflect a sudden silent area, which is expressed as a sudden disappearance of sound in a sense of listening, and a sudden decrease in energy.

In some possible implementations, since the first accompaniment is a segment of target accompaniment, and the first accompaniment is a collection of multiple first audio frames, when the second probability value is less than or equal to the preset second classification threshold, the electronic device may obtain a third type of audio features of the multiple first audio frames, and may use the set of the third type of audio features of the multiple first audio frames as the third type of audio features of the target accompaniment.

For example, suppose the target accompaniment has 2000 audio frames, the target time period is from the $30^{th}$ second to the second minute-and-$30^{th}$ second, that is, there are 1600 audio frames in the target time period, and the first accompaniment has 1600 audio frames, and the target accompaniment is has 400 audio frames from 0 to the $30^{th}$ second. Mel spectral features, RASTA-PLP features, PLP coefficients, spectral entropy, first-order difference coefficients of RASTA-PLP features, second-order difference coefficients of RASTA-PLP features, spectral roll-off, continuity features of harmonic intensity, sudden silence features are represented by A, B, C, D, E, E', F, G, and H, respectively. Suppose the second type of audio features includes six kinds of audio features: A, B, C, D, E, and E', and the third type of audio features includes nine kinds of audio features: A, B, C, D, E, E', F, G, and H. The third type of audio feature of the target accompaniment obtained by the electronic device is $X_3$ and $X3=[(A_{401}, A_{402}, \ldots, A_i, \ldots, A_{2000}), (B_{401}, B_{402}, \ldots, B_i, \ldots, B_{2000}), (C_{401}, C_{402}, \ldots, C_i, \ldots, C_{2000}), (D_{401}, D_{402}, \ldots, D_i, \ldots, D_{2000}), (E_{401}, E_{402}, \ldots,$ $E_i, \ldots, E_{2000}$), ($E'_{401}, E'_{402}, \ldots, E'_i, \ldots, E'_{2000}$), ($F_{401}, F_{402}, \ldots, F_i, \ldots, F_{2000}$), ($G_{401}, G_{402}, \ldots, G_i, \ldots, G_{2000}$), ($H_{401}, H_{402}, \ldots, H_i, \ldots, H_{2000}$)], i represents the $i^{th}$ first audio frame of the first accompaniment, or i represents the $i^{th}$ audio frame of the target accompaniment within the target time period.

At S409, a classification value is determined according to the third type of audio features of the target accompaniment, and an accompaniment category of the target accompaniment is determined according to the classification value.

In some possible implementations, after obtaining the third type of audio features of the target accompaniment, the electronic device may perform data normalization on each kind of audio features in the third type of audio features of the target accompaniment, to obtain the third feature-set of the target accompaniment. The third feature-set includes at least one kind of feature elements, and feature element types included in the third feature-set are the same as audio feature types included in the third type of audio features, that is, kinds of feature elements in the third feature-set corresponds to kinds of audio features in the third type of audio features in a one-to one correspondence, and one kind of feature element in the third feature-set is obtained from one kind of audio feature in the third type of audio features after data normalization.

For example, the third type of audio features includes nine kinds of audio features: A, B, C, D, E, E', F, G, and H, then the third feature-set includes feature elements of the nine kinds of audio features of A, B, C, D, E, E', F, G, and H. After obtaining the third feature-set of the target accompaniment, the electronic device may obtain a third classification model, and may input the third feature-set into the third classification model for processing. The accompaniment category of the target accompaniment can be predicted with the third classification model based on the third feature-set, and a classification value of the accompaniment category can be output by the third classification model. The electronic device may obtain the classification value output by the third classification model, and may obtain a first value (e.g., 2), a second value (e.g., 1), and a third value (e.g., 0), which are set in advance. The electronic device may respectively compare whether the classification value output by the third classification model is the same as the first value, the second value, or the third value. When the classification value is the same as the first value, that is, the classification value is the first value, the electronic device may determine the accompaniment category of the target accompaniment to be the third category of accompaniments (e.g., high-quality vocal-cut accompaniments). When the classification value is the same as the second value, that is, the classification value is the second value, the electronic device may determine the accompaniment category of the target accompaniment to be the fourth category of accompaniments (e.g., medium-quality vocal-cut accompaniments). When the classification value is the same as the third value, that is, the classification value is the third value, the electronic device may determine the accompaniment category of the target accompaniment to be the fifth category of accompaniments (e.g., low-quality vocal-cut accompaniments). In this implementation of the present disclosure, when the accompaniment category of the target accompaniment is not the second category of accompaniments, the third type of audio features of the target accompaniment is extracted, and the accompaniment category of the target accompaniment is determined according to the third type of audio features of the target accompaniment. As such, the accompaniment category of the target accompaniment is further divided, and a more detailed accompaniment category classification can be obtained.

The third classification model may be a 10-layer CNN model, and an activation function of the third classification model may be a softmax function. The third classification model can be trained based on third types of audio features and third types of classification labels of at least three categories of accompaniments, and the third types of classification labels can at least include a classification label of the third category of accompaniments, a classification label of the fourth category of accompaniments, and a classification label of the fifth category of accompaniments. The third category label can be set by the user, for example, in the third category labels, "2" is used to identify the third category of accompaniments (such as high-quality vocal-cut accompaniments), "1" is used to identify the fourth category of accompaniments (medium-quality vocal-cut accompaniments), and "0" is used to identify the fifth category of accompaniments (low-quality vocal-cut accompaniments). The data normalization may include at least one of following normalization method: min-max normalization, zero-mean normalization (z-score normalization), and decimal scaling normalization. A range of the second probability value is [0, 1].

In some possible implementations, before the electronic device obtains the third classification model, the third classification model may be generated in advance. For a generation manner of the third classification model, reference can be made to implementations of each operation in the implementations in FIG. 1, specifically as follows. (a) P accompaniments are selected from N accompaniments, and accompaniment categories of the P accompaniments are neither the first category of accompaniments nor the second category of accompaniments. (b) samples of the P accompaniments are divided to obtain a training data set, a verification data set, and a test data set. The user can manually mark each of the P accompaniments, by marking the third category of accompaniments (i.e., high-quality vocal-cut accompaniments) with classification label "2", the fourth category of accompaniments (i.e., medium-quality vocal-cut accompaniments) with classification label "1", and the fifth category of accompaniments (low-quality vocal-cut accompaniments) with classification label "0". (c) each of the P accompaniments is preprocessed to obtain P third accompaniments. For example, for each of the P accompaniments, data before the first time point is removed, and an accompaniment in the P accompaniments whose time length is less than the second time point are zero-filled, to obtain the P third accompaniments. The first time point and the second time point collectively determine a time period, that is, the target time period. The first time point may be the minimum time point of the target time period, and the second time point may be the maximum time point of the target time period. (d) a third type of audio features of each of the P third accompaniments is extracted, and feature encapsulation is performed on the third type of audio features of each third accompaniment to obtain sample data of each third accompaniment. The third type of audio features may include the second type of audio features, and may further include at least one kind of following audio features: spectrum roll-off, continuity features of harmonic intensity, or sudden silence features. (e) a third CNN model is constructed, the third CNN model may have 10 layers, and an activation function may be softmax. (f) sample data in the training data set obtained in step (d) is input into the constructed third CNN model for training, and the third CNN model is adjusted based on sample data in the validation data set and test data set obtained in step (d). (g) the trained third CNN model is determined as the third classification model.

In implementations of the present disclosure, the electronic device obtains the first type of audio features of the target accompaniment, and then performs data normalization on each type of audio features in the first type of audio features of the target accompaniment, so as to obtain the first feature-set of the target accompaniment. The electronic device inputs the first feature-set into the first classification model for processing, and obtains the first probability value output by the first classification model for the first feature-set. When the first probability value is greater than the first classification threshold, the accompaniment category of the target accompaniment is determined to be the first categories of accompaniments. When the first probability value is less than or equal to the first classification threshold, the second type of audio features of the target accompaniment is obtained, and the second probability value is determined according to the second type of audio feature of the target accompaniment. When the second probability value is greater than the second classification threshold, the accompaniment category of the target accompaniment is determined to be the second category of accompaniments. When the second probability value is less than or equal to the second classification threshold, the third type of audio features of the target accompaniment is obtained, and the classification value is determined according to the third type of audio features of the target accompaniment. The accompaniment category of the target accompaniment is determined according to the classification value. Through multi-level classification, it is not only possible to achieve fast and effective classification of accompaniments, improve the efficiency of accompaniment classification, reduce labor costs, but also obtain more detailed accompaniment categories.

Figure 5:
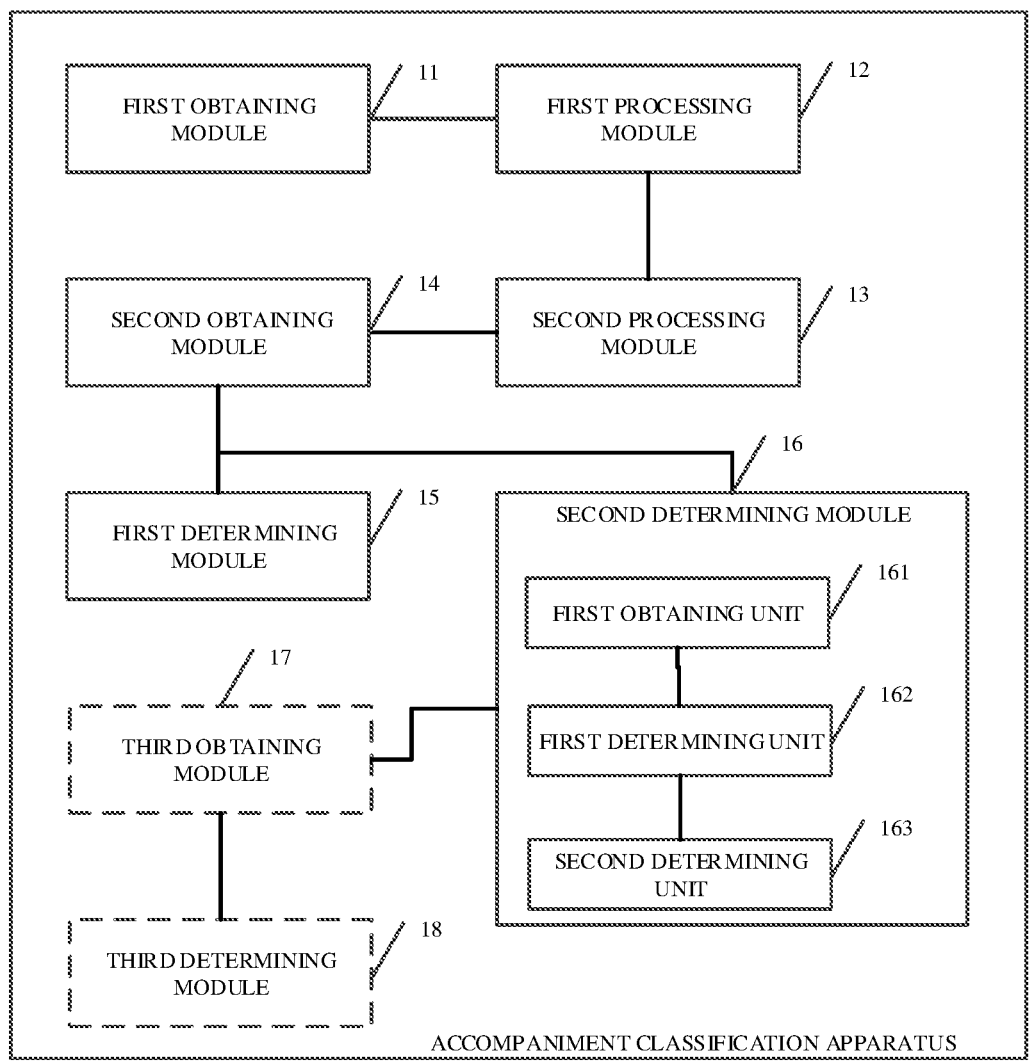
FIG. 5 is a schematic structural diagram illustrating an accompaniment classification apparatus provided in implementations of the present disclosure.

Reference is made to FIG. 5, which is a schematic structural diagram illustrating an accompaniment classification apparatus provided in implementations of the present disclosure. As illustrated in FIG. 5, the accompaniment classification apparatus at least includes a first obtaining module 11, a first processing module 12, a second processing module 13, a second obtaining module 14, a first determining module 15, and a second determining module 16.

The first obtaining module 11 is configured to obtain a first type of audio features of a target accompaniment, where the first type of audio features includes at least one kind of audio features.

The first processing module 12 is configured to perform data normalization on each kind of audio features in the first type of audio features of the target accompaniment to obtain a first feature-set of the target accompaniment, where the first feature-set include at least one kind of audio features.

The second processing module 13 is configured to input the first feature-set into a first classification model for processing, the first classification model being a convolutional neural network model.

The second obtaining module 14 is configured to obtain a first probability value output by the first classification model for the first feature-set.

The first determining module 15 is configured to determine an accompaniment category of the target accompaniment to be a first category of accompaniments when the first probability value is greater than a first classification threshold.

The second determining module 16 is configured to determine the accompaniment category of the target accompaniment to be other categories of accompaniments when the first probability value is less than or equal to the first classification threshold.

In some possible implementations, the first classification model is trained based on first types of audio features and first classification labels of at least two categories of accompaniments, and the first classification labels include a class label of the first category of accompaniments and a class label of at least one other category of accompaniments.

In some possible implementations, the first type of audio features includes at least one kind of Mel spectral features, relative spectral transformation-perceptual linear prediction (RASTA-PLP) features, or perceptual linear prediction (PLP) coefficients. The second determining module 16 includes a first obtaining unit 161, a first determining unit 162, and a second determining unit 163.

The first obtaining unit 161 is configured to obtain a second type of audio features of the target accompaniment, the second type of audio features including the first type of audio features, and the second type of audio features further including at least one kind of: spectral entropy, first-order difference coefficients of the RASTA-PLP features, or second-order difference coefficients of the RASTA-PLP features. The first determining unit 162 is configured to determine a second probability value according to the second type of audio features of the target accompaniment. The second determining unit 163 is configured to determine the accompaniment category of the target accompaniment to be a second category of accompaniments when the second probability value is greater than a second classification threshold.

In some possible implementations, the apparatus further includes a third obtaining module 17 and a third determining module 18. The third obtaining module 17 is configured to obtain a third type of audio features of the target accompaniment when the second probability value is less than or equal to the second classification threshold, where the third type of audio feature includes the second type of audio features, and the third type of audio feature further includes at least one kind of spectral roll-off, continuity features of harmonic intensity, or sudden silence features. The third determining module 18 is configured to determine a classification value according to the third type of audio features of the target accompaniment, and determine an accompaniment category of the target accompaniment according to the classification value.

In some possible implementations, the third determining module 18 is specifically configured to perform data normalization on each kind of audio features in the third type of audio features of the target accompaniment to obtain a third feature-set of the target accompaniment, and input the third feature-set into a third classification model for processing; obtain the classification value output by the third classification model for the third d feature-set; determine the accompaniment category of the target accompaniment to be a third category of accompaniments when the classification value is a first value; determine the accompaniment category of the target accompaniment to be a fourth category of accompaniments when the classification value is a second value; and determine the accompaniment category of the target accompaniment to be a fifth category of accompaniments when the classification value is a third value. The third feature-set includes at least three kinds of feature elements, kinds of feature elements in the third feature-set correspond to kinds of audio features in the third type of audio features in a one-to one correspondence, the third classification model is obtained according to third types of audio features and third classification labels of at least three categories of accompaniments, and the third classification labels at least include a classification label of the third category of accompaniments, a classification label of the fourth category of accompaniments, and a classification label of the fifth category of accompaniments In some possible implementations, the first obtaining unit 161 is specifically configured to select a first accompaniment from the target accompaniment within a target time period; and extract second type of audio features of the first accompaniment. The second type of audio features of the first accompaniment is the second type of audio features of the target accompaniment.

In some possible implementations, each kind of audio features in the first type of audio features includes features of multiple dimensions, the first processing module 12 is specifically configured to: for each kind of audio features in the first type of audio features of the target accompaniment, perform data normalization on a feature of each dimension of each kind of audio features based on zero-mean normalization, to obtain the first feature-set of the target accompaniment, where each kind of feature elements in the first feature-set includes at least one group of elements, and groups of elements of one kind of feature elements in the first feature-set correspond to features of one dimension of one kind of audio features in the first type of audio features in a one-to one correspondence.

The first obtaining module 11, the first processing module 12, the second processing module 13, the second acquisition module 14, the first determining module 15, the second determining module 16, and the third obtaining module 17, and/or the third determining module 18 may be one module, such as a processing module. The first obtaining unit 161, the first determining unit 162, and/or the second determining unit 163 may be one unit, such as a processing unit.

In a specific implementation, the accompaniment classification apparatus can execute implementations provided in each step in the implementations provided in FIG. 1, FIG. 3 or FIG. 4, to achieve functions which can be achieved by the above implementations, and reference can be made to corresponding descriptions provided in each step in method implementations in FIG. 1, FIG. 3, or FIG. 4, which will not be repeated here.

The accompaniment classification apparatus of the implementations of the present disclosure obtains the first type of audio features of the target accompaniment, and then performs data normalization on each kind of audio features in the first type of audio features of the target accompaniment, to obtain the first feature-set of the target accompaniment. The accompaniment classification apparatus inputs the first feature-set of the target accompaniment into the first classification model for processing, obtains the first probability value output by the first classification model for the first feature-set, and determines the accompaniment category of the target accompaniment according to the first probability value. As such, accompaniments can be classified quickly and effectively, the efficiency of accompaniment classification can be improved, and labor costs can be reduced.

Figure 6:
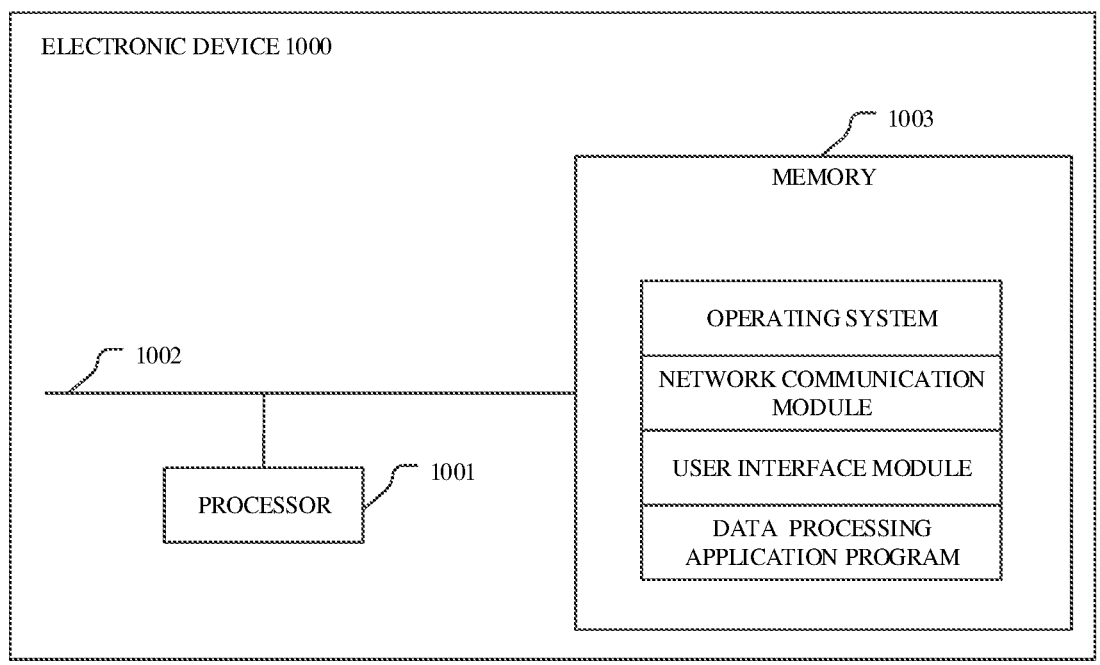
FIG. 6 is a schematic structural diagram illustrating an electronic device provided in implementations of the present disclosure.

Reference can be made to FIG. 6, which is a schematic structural diagram illustrating an electronic device provided in implementations of the present disclosure. As illustrated in FIG. 6, the electronic device 1000 in implementations of the present disclosure may include a processor 1001 and a memory 1003. In addition, the electronic device 1000 may further include at least one communication bus 1002. The communication bus 1002 is configured to realize connection and communication between these components. The memory 1003 may be a high-speed random access memory (RAM) memory, or a non-volatile memory, such as at least one disk memory. Optionally, the memory 1003 may also be at least one storage device disposed away from the processor 1001. As illustrated in FIG. 6, the memory 1003 as a computer-readable storage medium may include an operating system, a network communication module, a user interface module, and a device control application program.

In the electronic device 1000 illustrated in FIG. 6, the processor 1001 can be used to call the device control application program stored in the memory 1003 to realize: obtaining a first type of audio features of a target accompaniment, the first type of audio features including at least one kind of audio features; performing data normalization on each kind of audio features in the first type of audio features of the target accompaniment to obtain a first feature-set of the target accompaniment, the first feature-set including at least one kind of audio features; inputting the first feature-set into a first classification model for processing, the first classification model being a convolutional neural network model; obtaining a first probability value output by the first classification model for the first feature-set; and determining an accompaniment category of the target accompaniment according to the first probability value.

It can be understood that, in implementations of the present disclosure, the processor 1001 may be a central processing unit (CPU), and the processor may also may also be a general-purpose processor, a digital signal processor (DSP), an application specific integrated circuit (ASIC), a field programmable gate array (FPGA), or other programmable logic devices, discrete gates or transistor logic devices, or discrete hardware components. The general purpose processor may be a microprocessor, or any conventional processors or the like.

The memory 1003 may include a read only memory (ROM) and a random access memory (RAM), and is configured to provide instructions and data to the processor 1001. Part of the memory 1003 may further include a non-volatile RAM. For example, the memory 1003 may also store device-type information.

In specific implementations, the electronic device 1000 described in implementations of the present application may execute the method for generating the first classification model in implementations corresponding to FIG. 1. or the accompaniment classification method in implementations corresponding to FIG. 3 or FIG. 4, or the accompaniment classification apparatus in implementations corresponding to FIG. 5, which are not be repeated here. In addition, beneficial effects of using the same method will not be repeated here as well.

In addition, it should be noted here that, a computer-readable storage medium is further provided in implementations of the present disclosure, and the mentioned above computer program executed by the electronic device 1000 is stored in the computer-readable storage medium. The computer program includes program instructions which, when executed by the processor, may cause the processor to execute the method for generating the first classification model in implementations corresponding to FIG. 1, or the accompaniment classification method in implementations corresponding to FIG. 3 or FIG. 4, which will not be repeated here. In addition, beneficial effects of using the same method will not be repeated here as well. For technical details not disclosed in the computer-readable storage medium implementations involved in the present disclosure, reference can be made to descriptions of the method implementations of the present disclosure.

It can be understood by those skilled in the art that all or part of the processes in the above-mentioned methods can be completed by instructing related hardware through computer programs. The computer programs can be stored in a computer-readable storage medium, and when executed, involve processes of the above-mentioned methods. The storage medium can be a magnetic disk, an optical disk, a ROM, or a RAM.

The foregoing implementations are merely some implementations of the present disclosure. The protection scope of the present disclosure is not limited thereto. Those skilled in the art can easily think of various equivalent modifications or substitutions within the technical scope disclosed in the present disclosure, and these modifications or substitutions shall be fall in the scope of protection of the present disclosure. Therefore, the protection scope of the present disclosure shall be subject to the protection scope of the claims.

What is claimed is:

1. An accompaniment classification method, comprising:
    obtaining a first type of audio features of a target accompaniment, the first type of audio features comprising at least one kind of audio features, the first type of audio features comprising at least one kind of Mel spectral features, relative spectral transformation-perceptual linear prediction (RASTA-PLP) features, or perceptual linear prediction (PLP) coefficients;
    performing data normalization on each kind of audio features in the first type of audio features of the target accompaniment to obtain a first feature-set of the target accompaniment, the first feature-set comprising at least one kind of audio features;
    inputting the first feature-set into a first classification model for processing, the first classification model being a convolutional neural network model;
    obtaining a first probability value output by the first classification model for the first feature-set;
    determining an accompaniment category of the target accompaniment to be a first category of accompaniments when the first probability value is greater than a first classification threshold; and
    determining the accompaniment category of the target accompaniment to be other categories of accompaniments when the first probability value is less than or equal to the first classification threshold,
    wherein determining the accompaniment category of the target accompaniment to be other categories of accompaniments comprises:
        obtaining a second type of audio features of the target accompaniment, the second type of audio features comprising the first type of audio features, and the second type of audio features further comprising at least one kind of: spectral entropy, first-order difference coefficients of the RASTA-PLP features, or second-order difference coefficients of the RASTA-PLP features;
        determining a second probability value according to the second type of audio features of the target accompaniment; and
        determining the accompaniment category of the target accompaniment to be a second category of accompaniments when the second probability value is greater than a second classification threshold.

2. The method of claim 1, wherein determining the second probability value according to the second type of audio features of the target accompaniment comprises:
    performing data normalization on each kind of audio features in the second type of audio features of the target accompaniment to obtain a second feature-set of the target accompaniment, and inputting the second feature-set into a second classification model for processing, wherein the second feature-set comprises at least two kinds of feature elements, kinds of feature elements in the second feature-set corresponds to kinds of audio features in the second type of audio features in a one-to one correspondence, the second classification model is obtained according to second types of audio features and second classification labels of at least two categories of accompaniments, and the second classification labels comprise a class label of the second category of accompaniments and a class label of at least one other category of accompaniments; and
    obtaining the second probability value classification value output by the second classification model for the second feature-set.

3. The method of claim 2, further comprising:
    obtaining a third type of audio features of the target accompaniment when the second probability value is less than or equal to the second classification threshold, the third type of audio feature comprising the second type of audio features, and the third type of audio feature further comprising at least one kind of spectral roll-off, continuity features of harmonic intensity, or sudden silence features;
    determining a classification value according to the third type of audio features of the target accompaniment, and determining an accompaniment category of the target accompaniment according to the classification value.

4. The method of claim 3, wherein determining the classification value according to the third type of audio features of the target accompaniment, and determining the accompaniment category of the target accompaniment according to the classification value comprises:
    performing data normalization on each kind of audio features in the third type of audio features of the target accompaniment to obtain a third feature-set of the target accompaniment, and inputting the third feature-set into a third classification model for processing, wherein the third feature-set comprises at least three kinds of feature elements, kinds of feature elements in the third feature-set correspond to kinds of audio features in the third type of audio features in a one-to one correspondence, the third classification model is obtained according to third types of audio features and third classification labels of at least three categories of accompaniments, and the third classification labels at least comprises a classification label of a third category of accompaniments, a classification label of a fourth category of accompaniments, and a classification label of a fifth category of accompaniments;
    obtaining the classification value output by the third classification model for the third feature-set;
    determining the accompaniment category of the target accompaniment to be the third category of accompaniments when the classification value is a first value;
    determining the accompaniment category of the target accompaniment to be the fourth category of accompaniments when the classification value is a second value; and
    determining the accompaniment category of the target accompaniment to be the fifth category of accompaniments when the classification value is a third value.

5. The method of claim 1, wherein obtaining the second type of audio features of the target accompaniment comprises:
selecting a first accompaniment from the target accompaniment within a target time period; and
extracting second type of audio features of the first accompaniment.

6. The method of claim 1, wherein each kind of audio features in the first type of audio features comprises features of multiple dimensions, and wherein
performing data normalization on each kind of audio features in the first type of audio features of the target accompaniment to obtain the first feature-set of the target accompaniment comprises:
for each kind of audio features in the first type of audio features of the target accompaniment, performing data normalization on a feature of each dimension of each kind of audio features based on zero-mean normalization, to obtain the first feature-set of the target accompaniment, wherein each kind of feature elements in the first feature-set comprises at least one group of elements, and groups of elements of one kind of feature elements in the first feature-set correspond to features of one dimension of one kind of audio features in the first type of audio features in a one-to one correspondence.

7. The method of claim 1, wherein the first classification model is trained based on first types of audio features and first classification labels of at least two categories of accompaniments, and the first classification labels comprise a class label of the first category of accompaniments and a class label of at least one other category of accompaniments.

8. An electronic device, comprising a processor and a memory, wherein the processor is coupled with the memory, the memory is configured to store computer programs, the computer programs comprise program instructions, and the processor is configured to invoke the program instructions to perform:
obtaining a first type of audio features of a target accompaniment, the first type of audio features comprising at least one kind of audio features, the first type of audio features comprising at least one kind of Mel spectral features, relative spectral transformation-perceptual linear prediction (RASTA-PLP) features, or perceptual linear prediction (PLP) coefficients;
performing data normalization on each kind of audio features in the first type of audio features of the target accompaniment to obtain a first feature-set of the target accompaniment, the first feature-set comprising at least one kind of audio features;
inputting the first feature-set into a first classification model for processing, the first classification model being a convolutional neural network model;
obtaining a first probability value output by the first classification model for the first feature-set;
determining an accompaniment category of the target accompaniment to be a first category of accompaniments when the first probability value is greater than a first classification threshold; and
determining the accompaniment category of the target accompaniment to be other categories of accompaniments when the first probability value is less than or equal to the first classification threshold,
wherein in terms of determining the accompaniment category of the target accompaniment to be other categories of accompaniments, the processor is configured to invoke the program instructions to perform:
obtaining a second type of audio features of the target accompaniment, the second type of audio features comprising the first type of audio features, and the second type of audio features further comprising at least one kind of: spectral entropy, first-order difference coefficients of the RASTA-PLP features, or second-order difference coefficients of the RASTA-PLP features;
determining a second probability value according to the second type of audio features of the target accompaniment; and
determining the accompaniment category of the target accompaniment to be a second category of accompaniments when the second probability value is greater than a second classification threshold.

9. The electronic device of claim 8, wherein in terms of determining the second probability value according to the second type of audio features of the target accompaniment, the processor is configured to invoke the program instructions to perform:
performing data normalization on each kind of audio features in the second type of audio features of the target accompaniment to obtain a second feature-set of the target accompaniment, and inputting the second feature-set into a second classification model for processing, wherein the second feature-set comprises at least two kinds of feature elements, kinds of feature elements in the second feature-set corresponds to kinds of audio features in the second type of audio features in a one-to one correspondence, the second classification model is obtained according to second types of audio features and second classification labels of at least two categories of accompaniments, and the second classification labels comprise a class label of the second category of accompaniments and a class label of at least one other category of accompaniments; and
obtaining the second probability value classification value output by the second classification model for the second feature-set.

10. The electronic device of claim 9, wherein the processor is further configured to invoke the program instructions to perform:
obtaining a third type of audio features of the target accompaniment when the second probability value is less than or equal to the second classification threshold, the third type of audio feature comprising the second type of audio features, and the third type of audio feature further comprising at least one kind of spectral roll-off, continuity features of harmonic intensity, or sudden silence features;
determining a classification value according to the third type of audio features of the target accompaniment, and determining an accompaniment category of the target accompaniment according to the classification value.

11. The electronic device of claim 10, wherein in terms of determining the classification value according to the third type of audio features of the target accompaniment, and determining the accompaniment category of the target accompaniment according to the classification value, the processor is configured to invoke the program instructions to perform:
performing data normalization on each kind of audio features in the third type of audio features of the target accompaniment to obtain a second feature-set of the target accompaniment, and inputting the second feature-set into a third classification model for processing, wherein the second feature-set comprises at least three kinds of feature elements, kinds of feature elements in the third feature-set corresponds to kinds of audio features in the third type of audio features in a one-to one correspondence, the third classification model is obtained according to third types of audio features and third classification labels of at least three categories of accompaniments, and the third classification labels at least comprises a classification label of a third category of accompaniments, a classification label of a fourth category of accompaniments, and a classification label of a fifth category of accompaniments;

obtaining the classification value output by the third classification model for the second feature-set;

determining the accompaniment category of the target accompaniment to be the third category of accompaniments when the classification value is a first value;

determining the accompaniment category of the target accompaniment to be the fourth category of accompaniments when the classification value is a second value; and determining the accompaniment category of the target accompaniment to be the fifth category of accompaniments when the classification value is a third value.

12. The electronic device of claim 8, wherein in terms of obtaining the second type of audio features of the target accompaniment, the processor is configured to invoke the program instructions to perform:

selecting a first accompaniment from the target accompaniment within a target time period; and extracting second type of audio features of the first accompaniment.

13. The electronic device of claim 8, wherein each kind of audio features in the first type of audio features comprises features of multiple dimensions, and in terms of performing data normalization on each kind of audio features in the first type of audio features of the target accompaniment to obtain the first feature-set of the target accompaniment, the processor is configured to invoke the program instructions to perform:

for each kind of audio features in the first type of audio features of the target accompaniment, performing data normalization on a feature of each dimension of each kind of audio features based on zero-mean normalization, to obtain the first feature-set of the target accompaniment, wherein each kind of feature elements in the first feature-set comprises at least one group of elements, and one group of elements of kinds of feature elements in the first feature-set correspond to features of one dimension of one kind of audio features in the first type of audio features in a one-to one correspondence.

14. The electronic device of claim 8, wherein the first classification model is trained based on first types of audio features and first classification labels of at least two categories of accompaniments, and the first classification labels comprise a class label of the first category of accompaniments and a class label of at least one other category of accompaniments.

15. A non-transitory computer readable storage medium, wherein the computer readable storage medium is configured to store computer programs, the computer programs comprise program instructions which, when executed by a processor, are operable with the processor to perform:

obtaining a first type of audio features of a target accompaniment, the first type of audio features comprising at least one kind of audio features, the first type of audio features comprising at least one kind of Mel spectral features, relative spectral transformation-perceptual linear prediction (RASTA-PLP) features, or perceptual linear prediction (PLP) coefficients;

performing data normalization on each kind of audio features in the first type of audio features of the target accompaniment to obtain a first feature-set of the target accompaniment, the first feature-set comprising at least one kind of audio features;

inputting the first feature-set into a first classification model for processing, the first classification model being a convolutional neural network model;

obtaining a first probability value output by the first classification model for the first feature-set;

determining an accompaniment category of the target accompaniment to be a first category of accompaniments when the first probability value is greater than a first classification threshold; and determining the accompaniment category of the target accompaniment to be other categories of accompaniments when the first probability value is less than or equal to the first classification threshold, wherein in terms of determining the accompaniment category of the target accompaniment to be other categories of accompaniments, the program instructions, when executed by a processor, are operable with the processor to perform:

obtaining a second type of audio features of the target accompaniment, the second type of audio features comprising the first type of audio features, and the second type of audio features further comprising at least one kind of: spectral entropy, first-order difference coefficients of the RASTA-PLP features, or second-order difference coefficients of the RASTA-PLP features;

determining a second probability value according to the second type of audio features of the target accompaniment; and determining the accompaniment category of the target accompaniment to be a second category of accompaniments when the second probability value is greater than a second classification threshold.

16. The non-transitory computer readable storage medium of claim 15, wherein in terms of determining the second probability value according to the second type of audio features of the target accompaniment, the program instructions, when executed by a processor, are operable with the processor to perform:

performing data normalization on each kind of audio features in the second type of audio features of the target accompaniment to obtain a second feature-set of the target accompaniment, and inputting the second feature-set into a second classification model for processing, wherein the second feature-set comprises at least two kinds of feature elements, kinds of feature elements in the second feature-set correspond to kinds of audio features in the second type of audio features in a one-to one correspondence, the second classification model is obtained according to second types of audio features and second classification labels of at least two categories of accompaniments, and the second classification labels comprise a class label of the second category of accompaniments and a class label of at least one other category of accompaniments; and obtaining the second probability value classification value output by the second classification model for the second feature-set.

17. The non-transitory computer readable storage medium of claim 15, wherein the program instructions, when executed by a processor, further are operable with the processor to perform:
  obtaining a third type of audio features of the target accompaniment when the second probability value is less than or equal to the second classification threshold, the third type of audio feature comprising the second type of audio features, and the third type of audio feature further comprising at least one kind of spectral roll-off, continuity features of harmonic intensity, or sudden silence features;
  determining a classification value according to the third type of audio features of the target accompaniment, and determining an accompaniment category of the target accompaniment according to the classification value.

\* \* \* \* \*